May 24, 1966     J. N. ALBERTS ETAL     3,252,203
WELDING PROCESS
Filed Oct. 5, 1962
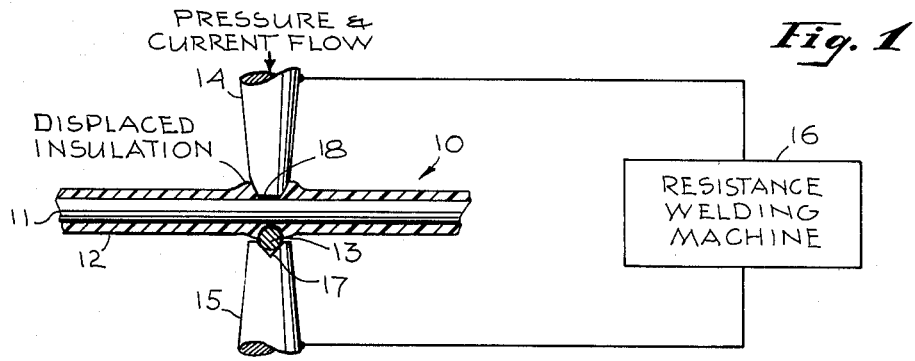
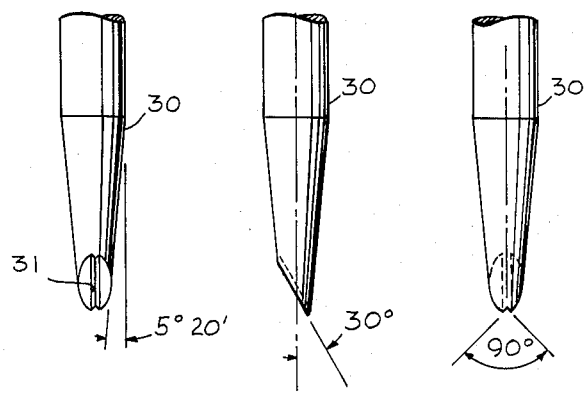
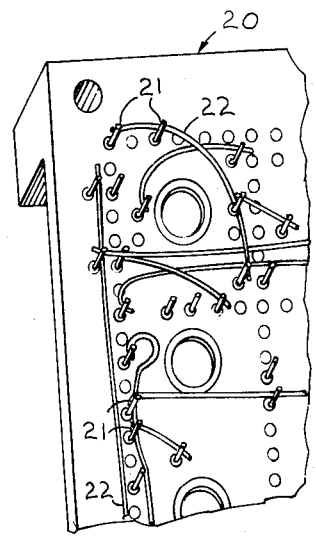
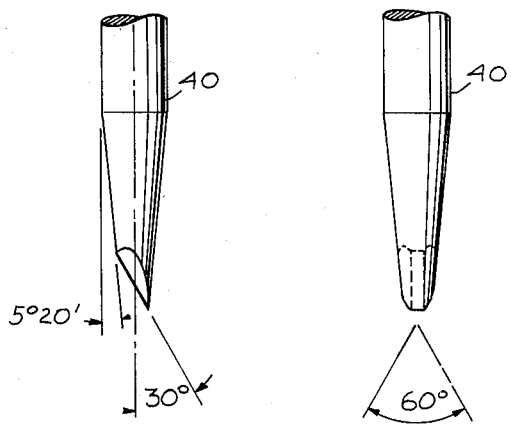
JAMES H. BRIMSON
JOSEPH N. ALBERTS
FRANCIS J. WINIARSKI
INVENTORS
BY *Gerald Geiger*
AGENT United States Patent Office 3,252,203
Patented May 24, 1966

3,252,203
WELDING PROCESS
Joseph N. Alberts, Los Angeles, James H. Brimson, Inglewood, and Francis J. Winiarski, Los Angeles, Calif., assignors, by mesne assignments, to TRW Inc., a corporation of Ohio
Filed Oct. 5, 1962, Ser. No. 228,523
7 Claims. (Cl. 29—155.5)

This invention relates generally to a welding process and more particularly to an apparatus and method for welding insulated wires together.

In the prior art it has always been considered necessary to physically remove the insulation covering a wire before attempting the welding operation. Different techniques for removing insulation have included mechanical stripping and abrasion techniques. For those systems in which a single length of insulated wire is connected to a plurality of separately located pins, the problem of physically removing the insulation at those discrete pin locations only is extremely difficult, if not impossible.

In this invention there is disclosed an improved welding method and apparatus that eliminates the need for first removing the insulation prior to assembling the wire for welding. The disclosed technique allows a continuous insulated wire the simplicity and flexibility of point-to-point wiring, coupled with the greater reliability and space-saving advantages of resistance welding. In addition, it is now possible to use a single continuous wire which is snaked to individual pin locations without the need of added insulation sleeving between connections, thereby allowing complicated wiring to be performed in a direct and simple manner by relatively unskilled labor. Since pre-heating or other treament of the insulated wire prior to welding is not required, insulation on the wire is not disturbed except at the welding points, thereby reducing possible damage to the insulated wire and improving reliability.

In the preferred embodiment of this invention resistance welding techniques are used to weld an insulated wire to an exposed electrically conductive terminal pin. The face and size of the electrode tips, used in connection with the welding machine, are arranged to contact the insulated wire and the pin in such a manner that the insulation abutting the pin and the electrode is displaced prior to passing a welding current through the electrodes. In one embodiment, a first electrode is V-shaped and cut at a convenient angle to hold and align the pin. The insulated wire is arranged to snake or pass adjacent to the pin and at right angles thereto. The second electrode has a substantially rectangular shape, preferably at the same angle as said V-groove in said first electrode and is positioned directly opposite the pin on the other side of the insulated wire. Forcing the electrodes together causes the insulation between the wire and pin to part due to the camming action between wires. The insulation between the wire and the second electrode is parted from the inside out due again to the camming action of the insulated wire against the substantially flat face on the electrode tip. After pressure is applied, welding may begin in the normal manner.

Further objects and advantages will be made more apparent as the description progresses. Reference is now made to the accompanying drawings wherein:

FIG. 1 is a cross-sectional drawing illustrating how the defined electrodes contact the insulated wire and terminal pin;

FIG. 2 is a drawing in perspective illustrating how a single continuous wire may be welded to a plurality of terminal pins;

FIGS. 3a, 3b, and 3c illustrate a preferred shape of the first electrode; and

FIGS. 4a and 4b illustrate a preferred shape for the second electrode.

Referring now to FIG. 1, there is shown in cross section an insulated wire 10 consisting of a conductor portion 11 and a continuous insulating portion 12. The wire 10 is arranged to pass adjacent to a bare terminal pin 13 and at right angles thereto. The terminal pin 13 is usually held in position by external means not illustrated in this figure, such as being molded in a terminal board, and provides electrical access to other parts of the circuit which are being interconnected by means of the wire 10. A pair of electrodes 14 and 15 are electrically connected to a resistance welding machine 16. The tip of electrode 15 has a preferred means for holding and aligning the terminal pin 13, such as a V-shaped groove 17. The electrode 14 is constructed with a substantially rectangular face 18 which is adapted to be pressed against the insulation 12.

In operation, the pin 13 is nested within the V-shaped groove 17 of the electrode 15. The electrode 14 is caused to press against the insulated wire 10 which, in turn, is pressed against the terminal pin 13. Continuing pressure between the electrodes 14 and 15 causes the insulation between the electrode 14 and the conductor 11 to part, thereby providing good electrical contact between the flat face 18 of the electrode and the conductor. This pressure between electrodes 14 and 15 actually causes the small diameter of the conductor 11 to act as a knife or camming action against the face 18 of electrode 14, thereby parting the insulation from the inside out.

The second displacement of insulation between the wire 10 and the terminal pin 13 occurs as a result of the small diameter conductor 11 being forced against the relatively large diameter terminal pin 13 at the point contact between the conductor and the terminal. With the insulation parted the resistance welding operation then proceeds in a normal manner.

In practicing the described invention, it has been found desirable and preferable to select an insulation material that is nonfibrous and soft enough to insure electrode penetration. For example, is was discovered that Teflon, as presently constructed, was too fibrous and that vinyl and ceramic were too hard. Materials having the desired characteristics should have a tensile strength of approximately 2,000 to 3,500 p.s.i., with approximately 75 percent elongation, thereby insuring that the material is soft enough for displacement due to the electrode pressure. In the preferred embodiment it was found that irradiated thermally stabilized polyolefin 0.005 to 0.007 inch thick and having tensile strength of 2,000 to 3,500 p.s.i. provided the best insulation characteristics. The conductor 11 used was nickel wire, chosen principally for its low conductivity and adaptability to resistance welding techniques. Best results have been obtained using with an electrode 15, having a 0.015 inch wide 90 degree V-shape groove 17, and an electrode 14, having a flat face 18 that is 0.025 inch wide. In this embodiment the resistance welding machine 16 was adjusted to pass 7 watt-seconds power and with 10.5 pounds pressure applied between electrodes 14 and 15.

Referring now to FIG. 2, there is shown a terminal board 20 having a plurality of terminal pins 21 molded in the board and extending vertically therethrough. The opposite side of the board 20, not illustrated, contains the electric elements in suitable module form that are individually connected to the exposed terminal pins 21. The exposed terminal pins 21, illustrated, are available for suitable interconnection by means of individual lengths of the insulated wires 22. The wires 22 are snaked or laced from terminal pin to terminal pin in accordance with the needs of the over-all circuit. In practice, the welding operator is given instructions to interconnect certain of the terminal pins 21 together, and, in response thereto, an individual insulated wire 22 is snaked through the board 20 so as to be placed adjacent to the terminal pins 21 that are to be interconnected. The operator then welds the insulated wire 22 to the terminal pin 21, as instructed, without ever having to know or see a schematic diagram. Welding of the individual terminal pins 21 to the insulated wire 22 is performed in accordance with the description given in connection with FIG. 1. The advantages of the described system are that individual modules may be plugged or unplugged onto the opposite side of the board 20 without disturbing the interconnected wiring as illustrated in FIG. 2. In addition, the operator performing the welding operation does not need to be concerned with the identification of the electric components but rather need only follow instructions which indicate that an individually insulated wire 22 should be welded to a plurality of discrete and identifiable terminal pins 21. For convenience in selecting the terminal pin, the row of terminal pins on board 20 are numbered numerically along the length and alphabetically along the height.

Referring now to FIGS. 3a, 3b, and 3c, there is illustrated a series of drawings illustrating three different views of an electrode 30. FIG. 3a illustrates the face of the electrode containing a degree V-shaped groove 31. The defined face is actually a truncated cone cut at a convenient angle, for example, 30 degrees, as illustrated in FIG. 3b, which thereby exposes the face on the electrode as an ellipse. The size of the V-shaped groove is determined by the size of the terminal pins 21 used in connection with FIG. 2.

Referring now to FIGS. 4a and 4b, there is shown a second electrode 40. The electrode 40 is cut at the same angle as electrode 30, illustrated in FIG. 3, in order to facilitate the welding procedure, since both electrodes when placed in position against the terminal pin and wire will therefore define a 90 degree angle and facilitate the application of pressure between the electrodes. The face of the electrode 40 defines a rectangle for bearing against the insulated wire. The width of the rectangle is large with respect to the diameter of the conductor within the insulated wire.

In using the defined electrodes of FIGS. 3 and 4, approximately 10.5 pounds pressure is first applied between the electrodes for parting the insulation as previously described. As soon as all insulation is displaced and metal-to-metal contact is established, the welding circuit is energized and approximately 7 watt/seconds power is caused to flow, thereby completing the welding process. The electrodes are then removed for welding the next connection. Any bare conductor left exposed when the flat-faced electrode is removed is of such small area that it is insignificant.

This completes the description of the embodiment illustrated herein. However, many modifications and advantages thereof will be apparent to persons skilled in the art without departing from the spirit and scope of this invention. Accordingly, it is desired that this invention not be limited to the particular details of the embodiment disclosed herein, except as defined by the appended claims.

The embodiments of the invention in which an exclusive property or privilege is claimed are defined as follows:

1. A method of welding insulated wires together that comprises the steps of:
   first crossing the wires to be welded at substantially right angles to each other,
   then applying a pair of electrodes to opposite sides of the wires with sufficient force to part the insulation between electrode and wire and from between the wires, and
   then passing a welding current through the wires sufficient to weld the wires together.

2. A method of welding insulated wires together that comprises the steps of:
   first crossing the wires to be welded at substantially right angles to each other,
   then applying a force between a pair of electrodes to opposite sides of the wires while using one of the electrodes as an anvil member for support, said force being sufficient to cam the insulation away from the electrode and wire and from between the wires, and
   then passing a welding current through the wires sufficient to weld the wires together.

3. A method of welding insulated wires together that comprises the steps of:
   first crossing the wires to be welded at substantially right angles to each other,
   then applying a pair of electrodes to opposite sides of the wires with a force approximating 2,300 p.s.i. to part the insulation between electrode and wire and between the wires, and
   then passing a welding current through the wires sufficient to weld the wires together.

4. A method of welding insulated wires together that comprises the steps of:
   first crossing the wires to be welded at substantially right angles to each other,
   then applying a pair of electrode to opposite sides of the wires with a force of substantially 10 pounds to part the insulation between electrode and wire and between the wires, and
   then passing a welding current through the wires sufficient to weld the wires together.

5. A method of welding insulated wires together that comprises the steps of:
   first crossing the wires to be welded at substantially right angles to each other,
   then applying a pair of electrodes to opposite sides of the wires with sufficient force to part the insulation between electrode and wire and from between the wires, and
   then passing a welding current of substantially 7 amp./sec. through the wires to effect a weld.

6. A method of wiring a plurality of electronic modules together that comprises the steps of:
   first locating a plurality of bare conductive terminal pins vertically through a nonconductive panel board with the modules located on one side of the board and electrically connected to the pins,
   then snaking a plurality of insulated wire at substantially right angles and adjacent to previously selected terminal pins,
   then at each selected terminal pin applying a pair of electrodes to opposite sides of the insulated wire and the terminal pin, with sufficient force to part the insulation between electrode and wire and from between the wires, and
   then passing a welding current through the wires and electrodes sufficient to weld the wire together.

7. A method of welding an electrically insulated wire to a plurality of spaced apart terminal pins without first preparing the insulation on the wire that comprises the steps of:
   first snaking a single length of the insulated wire adjacent to and at substantially right angle to all of the selected terminal pins which are to be welded to the wire, then sequentially applying a pair of electrodes to opposite sides of the wire and the pin at each of the selected pins with sufficient force to part the insulation between electrode and wire and from between the wires, and then passing a welding current through the wires sufficient to weld the wires together.

References Cited by the Examiner

UNITED STATES PATENTS

| | | |
|---|---|---|
| 1,652,634 | 12/1927 | Oliver. |
| 1,685,382 | 9/1928 | Stuart. |
| 2,648,792 | 8/1953 | Wylie _____ 29—155.54 X |
| 2,707,823 | 5/1955 | Sowter _____ 29—470.1 |
| 2,872,565 | 2/1959 | Brooks _____ 174—84 X |
| 2,977,672 | 4/1961 | Telfer _____ 29—155.5 |
| 2,985,954 | 5/1961 | Jones et al. _____ 29—497.5 X |
| 3,065,524 | 11/1962 | Donnell et al. _____ 29—155.5 |
| 3,101,635 | 8/1963 | Kulicke _____ 29—497.5 X |
| 3,156,514 | 11/1964 | Wing et al. _____ 29—155.55 X |

JOHN F. CAMPBELL, *Primary Examiner.*

C. I. SHERMAN, *Assistant Examiner.*